United States Patent Office 3,326,906
Patented June 20, 1967

3,326,906
1,3,5-TRI-ORGANOTIN-S-TRIAZINE-
2,4,6-(1H,3H,5H)-TRIONES
Walter A. Stamm, Tarrytown, N.Y., assignor to Stauffer
Chemical Company, New York, N.Y., a corporation of
Delaware
No Drawing. Filed Oct. 1, 1963, Ser. No. 312,846
5 Claims. (Cl. 260—242)

ABSTRACT OF THE DISCLOSURE

The compounds described herein are triaryl- or trialkyltin triazines wherein the tin substituent is attached to the heterocyclic ring in the 1, 3, 5 positions. These compounds, which exhibit pesticidal activity, can be prepared by heating cyanuric acid with an organotin oxide such as trialkyltin hydroxide, bis(triphenyltin)oxide, bis(trialkyltin)oxide and the like, wherein the aforementioned alkyl group may contain from 1 to 18 carbon atoms. Exemplary of these compounds is 1,3,5-tris(tri-n-butyltin)-s-triazine-2,4,6-(1H, 3H, 5H)-trione, 1,3,5-tris(triphenyltin)-s-triazine-2,4,6-(1H, 3H, 5H)-trione, and 1,3,5-tri(tri-n-octyltin)-s-triazine-2,4,6-(1H, 3H, 5H)-trione.

---

This invention relates to organotin compounds and in particular to organotin heterocyclic derivatives in which a triaryl- or trialkyltin group is attached to cyanuric acid. The invention also pertains to a method of preparing the aforesaid compounds.

The new and novel organotin compounds of the present invention, which can be regarded generically as 1,3,5-tri-organotin-s-triazine-2,4,6-(1H, 3H, 5H)-triones, are deemed to be represented by the following formula:

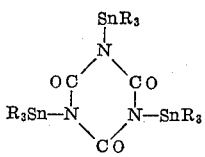

wherein R designates an alkyl radical having from 1 to 18 carbon atoms including both straight and branched configurations, e.g. methyl, ethyl, isopropyl, sec-butyl, n-butyl, n-pentyl, n-hexyl, 2-heptyl, 3-heptyl, 1-octyl, 5-nonyl, 1-nonyl, 1-decyl, 1-dodecyl, 1-tridecyl, 1-tetradecyl, 1-pentadecyl, 1-hexadecyl, 1-heptadecyl, 2-octadecyl, and the like, phenyl and benzyl.

In preparing the organotin compounds of the invention, I have ascertained that they may be generally realized by heating cyanuric acid with an organotin oxide such as a trialkyltin hydroxide, bis(triphenyltin)oxide, bis(trialkyltin)oxide, and the like. A convenient or preferred procedure is to heat the cyanuric acid and organotin oxide derivative at a temperature sufficient to fuse the reactants while removing the water of formation by the application of reduced pressure. A temperature range of from about 100° C. to about 200° C. has proven especially suitable. The course of the reaction can be schematically depicted by the following chemical equation:

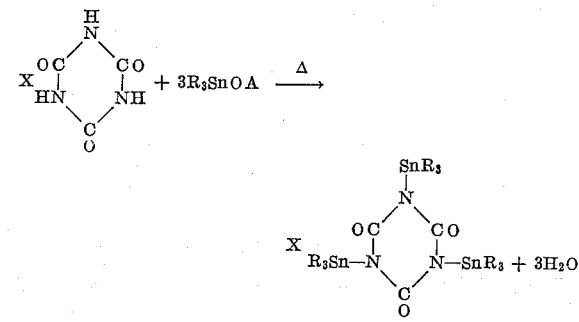

wherein R has the significance as previously set forth, A is hydrogen or —SnR$_3$ and $x$ is an integer of from 1 to 2, it being understood that $x$ is always 1 when A is hydrogen and 2 when A is —SnR$_3$.

Since cyanuric acid is known to exist in the following tautomeric forms

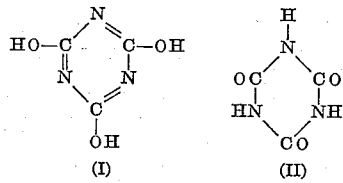

in which the hydrogen atoms may be attached to the oxygen as in the triol configuration or attached to the nitrogen atoms as in the trione configuration, it might be expected that the reaction of organotin oxides with cyanuric acids could engender two types of derivatives. On the one hand, the organotin moiety could replace the hydrogen in the triol tautomer while, on the other hand, it could replace the hydrogens affixed to the nitrogen atoms in the trione tautomer. It is, however, the latter reaction which accounts for the formation of organotin cyanuric acid derivatives of the invention, a conclusion which is supported by both chemical and instrumental analyses. I have, for instance, submitted the herein described organotin derivatives to infrared analysis, the results of which disclosed a complete absence of hydroxyl functions although strong carbonyl absorption was observed at 1620 cm.$^{-1}$ thus indicating the presence of the trione structure.

The organotin compounds of the present invention are characterized by an unusual thermal stability and can be exposed to relatively high temperature while evincing little or no tendency to decompose. Attention is called particularly to the compound of Example 1 which has withstood without appreciable degradation temperatures in excess of 320° C. That the trialkyltin triazones should exhibit such inordinately high thermal stability is unexpected since organotin derivatives in which the tin is linked to a nitrogen atom are generally unstable. In fact, only recently can one find instances wherein stable tin nitrogen bonds have been observed and in this connection reference is made to the publication by van der Kerk in Chimia 16, 10–15, 1962.

In addition to their excellent thermal properties, the organotin compounds as contemplated herein have other interesting and useful features. For instance, they have been shown to be biologically active in that they exhibit toxicity toward a variety of pest organisms of the type which afflict agricultural food crops. Another important and valuable characteristic of the trialkyltin triazones is their catalytic activity in facilitating the polymerization of organic isocyanates with alcohols to form polyurethane foams.

Reference is now made to the following examples which are inserted for the purpose of illustrating the invention. It is to be understood, however, that different modifications in practicing the invention will be evident to those skilled in the art to which the invention pertains without departing from the spirit or scope thereof.

*Example 1*

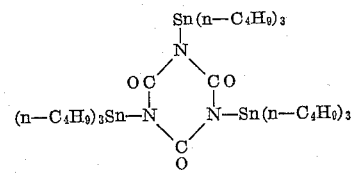

1,3,5,-tris(tri-n-butyltin)-s-triazine-2,4,6-(1H, 3H, 5H)-trione

In a reaction flask equipped with a thermometer and a distillation tube, was placed a mixture of 180 g. (0.3 mole) of bis(tri-n-butyltin)oxide and 26.0 g. (0.2 mole) of finely powdered cyanuric acid. The mixture was heated and when the temperature reached 120° C. water began evolving which was condensed in the receiver attached to the aforesaid distillation tube. The temperature was further increased and on reaching 160° C. all of the cyanuric acid had dissolved at which point 5.4 ml. (0.3 mole) of water had been collected. The temperature was finally raised to 190° C. while reducing the pressure to 0.1 mm. in order to remove residual traces of water and unreacted bis-(tri-n-butyltin)oxide.

The reaction product was obtained as a colorless, viscous, undistillable oil having an $N_D^{22}$ of 1.510. The analyses, both chemical and instrumental of the so-obtained product, are in conformity with the above depicted configuration.

*Example 2*

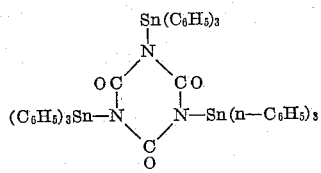

1,3,5-tris(triphenyltin)-s-triazine-2,4,6-(1H, 3H, 5H)-trione

The above depicted compound was prepared using the procedure as provided by Example 1, but using three moles of triphenyltin hydroxide and one mole of cyanuric acid, heated to 160 to 180° C. for one hour. The reaction product was obtained as a crystalline reaction product which did not melt below 360° C. The chemical and instrumental analyses substantiated the above depicted configuration.

*Example 3*

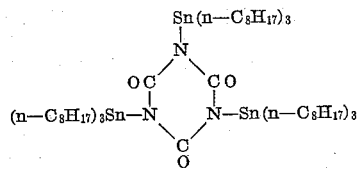

1,3,5-tris(tri-n-octyltin)-s-triazine-2,4,6-(1H, 3H, 5H)-trione

The above identified compound was prepared in accordance with the previous examples using approximately 3 moles of bis(tri-n-octyltin)oxide and about 1 mole of cyanuric acid. In general, the results and yield paralleled those obtained in the previous examples.

I claim:
1. An organotin compound of the formula

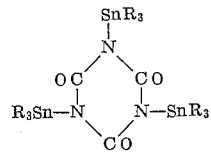

wherein R is alkyl of from 1 to 18 carbon atoms or phenyl.

2. An organotin compound of the formula

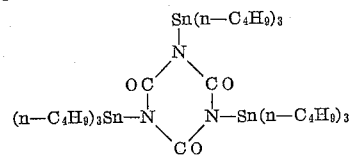

3. An organotin compound of the formula

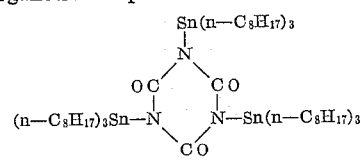

4. An organotin compound of the formula

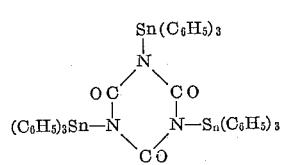

5. A method of preparing an organotin compound of the formula

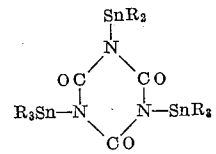

wherein R is alkyl of from 1 to 18 carbon atoms or phenyl, which comprises heating cyanuric acid with an organotin intermediate selected from the class consisting of a trialkyltin hydroxide in which the alkyl group has from 1 to 18 carbon atoms, a bis(trialkyltin)oxide in which the alkyl group has from 1 to 18 carbon atoms, a bis(triphenyltin)oxide and a triphenyltin hydroxide, it being understood that the molar proportion of cyanuric acid to the trialkyltin and triphenyltin hydroxide is 1:3 and the molar proportion of cyanuric acid to the bis(trialkyltin)oxide and bis(triphenyltin)oxide is 2:3, and isolating the so-formed organotin compound.

No references cited.

WALTER A. MODANCE, *Primary Examiner.*

ROBERT T. BOND, *Assistant Examiner.*